(12) United States Patent
Oyenan et al.

(10) Patent No.: US 10,048,918 B2
(45) Date of Patent: Aug. 14, 2018

(54) METHOD AND APPARATUS FOR VISUALIZING CRIME DETERRENT EFFECTS

(71) Applicant: MOTOROLA SOLUTIONS, INC, Schaumburg, IL (US)

(72) Inventors: Walamitien H Oyenan, Elk Grove Village, IL (US); Zheng Fang, Chicago, IL (US); Huitian Jiao, Schaumburg, IL (US); Wei Lin, Lake Zurich, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 76 days.

(21) Appl. No.: 15/203,965

(22) Filed: Jul. 7, 2016

(65) Prior Publication Data
US 2018/0011670 A1    Jan. 11, 2018

(51) Int. Cl.
*G06F 3/14* (2006.01)
*G01C 21/36* (2006.01)
*G06F 17/30* (2006.01)
*G06Q 50/26* (2012.01)
*G06T 3/40* (2006.01)
(Continued)

(52) U.S. Cl.
CPC ........... *G06F 3/14* (2013.01); *G01C 21/3461* (2013.01); *G01C 21/367* (2013.01); *G01C 21/3676* (2013.01); *G01C 21/3697* (2013.01); *G06F 17/30061* (2013.01); *G06F 17/30241* (2013.01); *G06Q 10/06* (2013.01); *G06Q 50/26* (2013.01);
(Continued)

(58) Field of Classification Search
CPC ................. G06F 3/14; G06F 17/30061; G06F 17/30241; G01C 21/3676; G01C 21/3679
See application file for complete search history.

(56) References Cited

U.S. PATENT DOCUMENTS

| | | | |
|---|---|---|---|
| 8,433,344 B1 | 4/2013 | Virga | |
| 8,515,673 B2 | 8/2013 | Trinko et al. | |

(Continued)

FOREIGN PATENT DOCUMENTS

WO    2015147670 A1    10/2015

OTHER PUBLICATIONS

Mohler, George O., Martin B. Short, Sean Malinowski, Mark Johnson, George E. Tita, Andrea L. Bertozzi, and P. Jeffrey Brantingharn. "Randomized controlled field trials of predictive policing", 2015, Journal of the American Statistical Association, in press.

(Continued)

*Primary Examiner* — Antonio A Caschera

(57) ABSTRACT

A process for displaying crime deterrent effects includes first receiving patrol route information indicating a patrol route taken by a law enforcement patrol and determining a type of the law enforcement patrol. Subsequently, a deterrent effect parameter associated with the law enforcement patrol is determined as a function of the determined type of the law enforcement patrol. Finally, an electronic display is caused to display a cartographic map of a geographic area at least partially including the patrol route taken by the law enforcement patrol and, along the patrol route taken, to display a deterrent effect indicator having a radius, width, size, and/or fade time that varies as a function of the type of the determined deterrent effect parameter.

20 Claims, 9 Drawing Sheets

(51) Int. Cl.
*G06T 11/00* (2006.01)
*G01C 21/34* (2006.01)
*G06Q 10/06* (2012.01)
*G06Q 50/18* (2012.01)

(52) U.S. Cl.
CPC .............. *G06T 3/40* (2013.01); *G06T 11/001* (2013.01); *G06Q 50/18* (2013.01)

(56) References Cited

U.S. PATENT DOCUMENTS

| | | | |
|---|---|---|---|
| 8,949,164 B1 | 2/2015 | Mohler | |
| 2004/0054428 A1* | 3/2004 | Sheha | ................ G01C 21/3664 700/56 |
| 2010/0100319 A1 | 4/2010 | Trinko et al. | |
| 2015/0073759 A1 | 3/2015 | Vepakomma et al. | |

OTHER PUBLICATIONS

The International Search Report and the Written Opinion, corresponding application No. PCT/US2017/039873 filed Jun. 29, 2017, dated Oct. 6, 2017, all pages.

* cited by examiner

METHOD AND APPARATUS FOR VISUALIZING CRIME DETERRENT EFFECTS

BACKGROUND OF THE INVENTION

Law enforcement agencies have traditionally relied upon patrolling activity to provide a deterrent effect for assigned "beats" or patrol routes in a geographic area that have been assigned to a particular officer. Marked or unmarked law enforcement patrols, whether they be vehicular, airborne, or traditional beat police that walk the patrol routes are intended to create a link between the community and the police agency charged with policing the community, while at the same time providing a visual deterrent to opportunistic crimes. Before the advent of radio communications, such patrol routes were written on cards that established particular locations and times that the law enforcement patrol should be at prior to returning to the precinct. Even with the advent of radio communications, such community patrolling techniques have not disappeared, but are now supported and enhanced through the use of audio and data communications transmitted over radio access networks (RANs).

Such RANs provide for radio communication links to be arranged within the network between a plurality of law enforcement patrols and their respective radio communications units. Such radio communications units may be mobile and may be known as 'mobile stations' or 'subscriber units' (SUs). At least one other terminal, e.g. used in conjunction with the SUs, may be a fixed terminal, e.g. a base station, eNodeB, repeater, and/or access point. Such a RAN typically includes a system infrastructure that generally includes a network of various fixed terminals, which are in direct radio communication with the SUs. Each of the fixed terminals operating in the RAN may have one or more transceivers which may, for example, serve SUs in a given region or area, known as a 'cell' or 'site', by radio frequency (RF) communication. The SUs that are in direct communication with a particular fixed terminal are said to be served by the fixed terminal. In one example, all radio communications to and from each SU within the RAN are made via respective serving fixed terminals. Sites of neighboring fixed terminals may be offset from one another and may be non-overlapping or partially or fully overlapping with one another.

RANs may operate according to any one of a number of available industry standard protocols such as, for example, an open media alliance (OMA) push to talk (PTT) over cellular (OMA-PoC) standard, a voice over IP (VoIP) standard, or a PTT over IP (PoIP) standard. Typically, protocols such as PoC, VoIP, and PoIP are implemented over broadband RANs including third generation and fourth generation networks such as third generation partnership project (3GPP) Long Term Evolution (LTE) networks.

RANs may additionally or alternatively operate according to an industry standard land mobile radio (LMR) protocol such as, for example, the Project 25 (P25) standard defined by the Association of Public Safety Communications Officials International (APCO), or other radio protocols, the Terrestrial Trunked Radio (TETRA) standard defined by the European Telecommunication Standards Institute (ETSI), the Digital Private Mobile Radio (dPMR) standard also defined by the ETSI, or the Digital Mobile Radio (DMR) standard also defined by the ETSI. Because these systems generally provide lower throughput than the 3GPP and LTE systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocols. Subscriber units in RANs such as those set forth above send and receive audio and/or data (e.g., encoded voice, audio, video, control information, data, and/or audio/video streams) in accordance with the designated protocol.

For example, as shown in FIG. 1, a patrollable geographic area 100, which may comprise a plurality of streets, intersections, commercial and residential buildings, parks, and other areas, may include a plurality of law enforcement patrols 112A, 114A, and 118A of different law enforcement patrol types already navigating patrol routes in the area 100. Each law enforcement patrol may be a person and/or vehicle of some type with an associated radio communication unit (e.g., portable or mobile SU) capable of communicating wirelessly with each other and/or with a RAN 126. Such law enforcement patrols 112A, 114A, and 118A may include, for example, a first pedestrian law enforcement patrol 112A (e.g., a marked or unmarked traffic control officer operating on-foot) with an associated SU, a motor vehicle law enforcement patrol 114A (e.g., a marked or unmarked police car) with an associated SU, and a mobile aerial law enforcement patrol 118A (e.g., marked drone or helicopter) with an associated SU. Other potential law enforcement patrols (not illustrated in FIG. 1) of same or different types may fall outside of the area 100, but may be available to proceed to the area 100 as needed.

Each of the law enforcement patrols 112A, 114A, and 118A may, in one example, already be actively using RF resources 128 of the RAN 126, which may be a LMR, LTE, or other type of RAN providing coverage substantially throughout the area 100, the RAN 126 is illustrated in FIG. 1 as including a single fixed terminal 130 coupled to a controller 132 (e.g., radio controller, call controller, PTT server, zone controller, MME, BSC, MSC, site controller, Push-to-Talk controller, or other network device).

A dispatch console 134 may be directly coupled to controller 132, as shown, or may be indirectly coupled to controller 132 via one or more internal or externals networks. The dispatch console 134 allows an administrator or dispatcher at the dispatch console 134 to initiate infrastructure-sourced private and/or group communications to law enforcement patrols 112A, 114A, and 118A, and to participate in private and group communications sourced by law enforcement patrols 112A, 114A, and 118A, among other features and functions.

Law enforcement patrols 112A, 114A, and 118A may be assigned static patrol routes that they are instructed to patrol on a regular basis. Each patrol route may comprise a particular intersecting or non-intersecting set of streets, portions of streets, intersections, parks, commercial and/or residential buildings, among other areas. For example, law enforcement patrol 112A may be assigned a patrol route 152 including a particular street portion, intersections, and park to patrol, law enforcement patrol 114A may be assigned a patrol route 154 including a particular set of streets and intersections to patrol, and law enforcement patrol 118A may be assigned a patrol route 158 including a particular set of streets and alleyways to patrol.

Conventionally, the effects of such law enforcement patrols are not easily visualized or communicated to other law enforcement personnel or to civilian populations, and such patrols are assigned independent of any knowledge of underlying historical or real-time crime statistics and variations in deterrent effects of different types of law enforcement patrols.

Accordingly, there is a need for an improved method and apparatus for visualizing deterrent effects of law enforcement patrols, and for more intelligently assigning different types of law enforcement patrols to particular patrol routes using knowledge of underlying historical and/or real-time crime trends.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
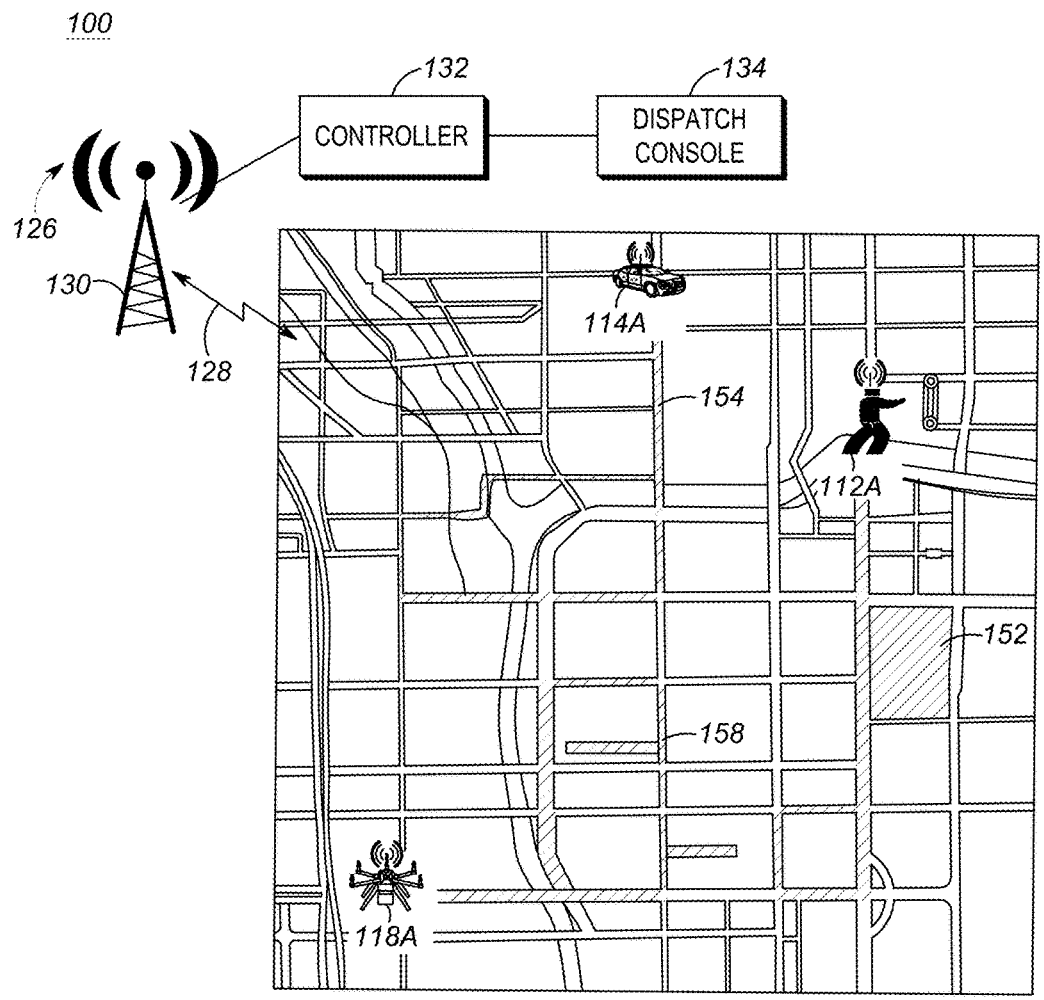
FIG. 1 is a schematic diagram of an existing patrollable geographic area illustrating conventional law enforcement patrols along patrol routes.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for visualizing deterrent effects of law enforcement patrols, and for more intelligently assigning different types of law enforcement patrols to particular patrol routes using knowledge of underlying historical and/or real-time crime trends.

In one embodiment, a process for displaying crime deterrent effects includes: receiving, at a computing device, patrol route information indicating a patrol route taken by a law enforcement patrol; determining, by the computing device, a type of the law enforcement patrol; determining, by the computing device, as a function of the determined type of the law enforcement patrol, a deterrent effect parameter associated with the law enforcement patrol; and causing, by the computing device, an electronic display to display a cartographic map of a geographic area at least partially including the patrol route taken by the law enforcement patrol and, along the patrol route taken, to display a deterrent effect indicator having a radius, width, size, and/or fade time that varies as a function of the type of the determined deterrent effect parameter.

In another embodiment, a controller for causing a display of crime deterrent effects includes: a transceiver; a data store; and one or more processors configured to: receive, via the transceiver, patrol route information indicating a patrol route taken by a law enforcement patrol; determine a type of the law enforcement patrol; determine, as a function of the determined type of the law enforcement patrol, a deterrent effect parameter associated with the law enforcement patrol; and cause an electronic display to display a cartographic map of a geographic area at least partially including the patrol route taken by the law enforcement patrol and, along the patrol route taken, to display a deterrent effect indicator having a radius, width, size, and/or fade time that varies as a function of the type of the determined deterrent effect parameter.

Each of the above-mentioned embodiments will be discussed in more detail below, starting with example electronic controller device and subscriber device structures, followed by geographic area schematic diagrams and processing steps for supporting displaying and visualizing of deterrent effect indicators for different types of law enforcement patrols, followed by further geographic area schematic diagrams and processing steps in which deterrent effect factors are used to more intelligently assign different types of law enforcement patrols to particular patrol routes using knowledge of underlying historical and/or real-time crime trends. Further advantages and features consistent with this disclosure will be set forth in the following detailed description, with reference to the figures.

1. EXAMPLE ELECTRONIC CONTROLLER DEVICE AND SUBSCRIBER DEVICE STRUCTURES

Figure 2:
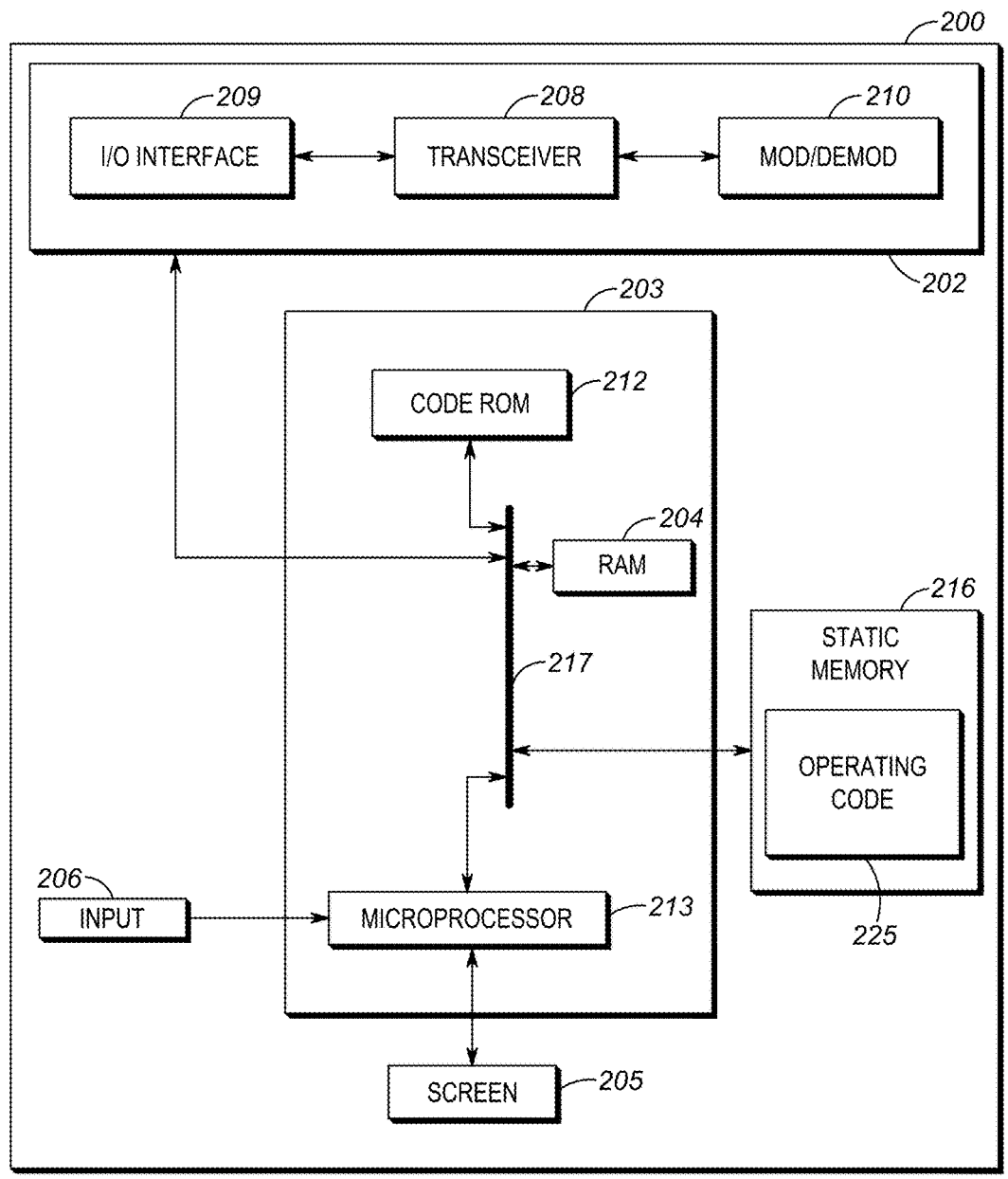
FIG. 2 is a block diagram of an electronic controller device capable of performing one or more of the steps set forth in FIGS. 6 and 9 in accordance with some embodiments.

Referring to FIG. 2, a block diagram illustrates a controller 200 that may be used in accordance with some embodiments for visualizing deterrent effect indications of law enforcement patrols, and/or for more intelligently assigning different types of law enforcement patrols to particular patrol routes using knowledge of underlying historical and/or real-time crime trends. The controller 200 includes a communications unit 202 coupled to a common data and address bus 217 of a processing unit 203. The controller 200 may also include an input unit (e.g., keypad, pointing device, etc.) 206 and a display screen 205, each coupled to be in communication with the processing unit 203.

The processing unit 203 may also include a code Read Only Memory (ROM) 212 for storing data for initializing system components. The processing unit 203 may further include a microprocessor 213 coupled, by the common data and address bus 217, to a Random Access Memory (RAM) 204 and a static memory 216 (i.e., a data store). The microprocessor 213 has ports for coupling to the input unit 206 and to the display screen 205.

The communications unit 202 may include one or more wired or wireless input/output (I/O) interfaces 209 that are configurable to communicate with other devices such as a base station 130 or dispatch console 134 of FIG. 1. The communications unit 202 may include one or more wireless transceivers 208, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The communications unit 202 may alternatively or additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210.

Figure 6:
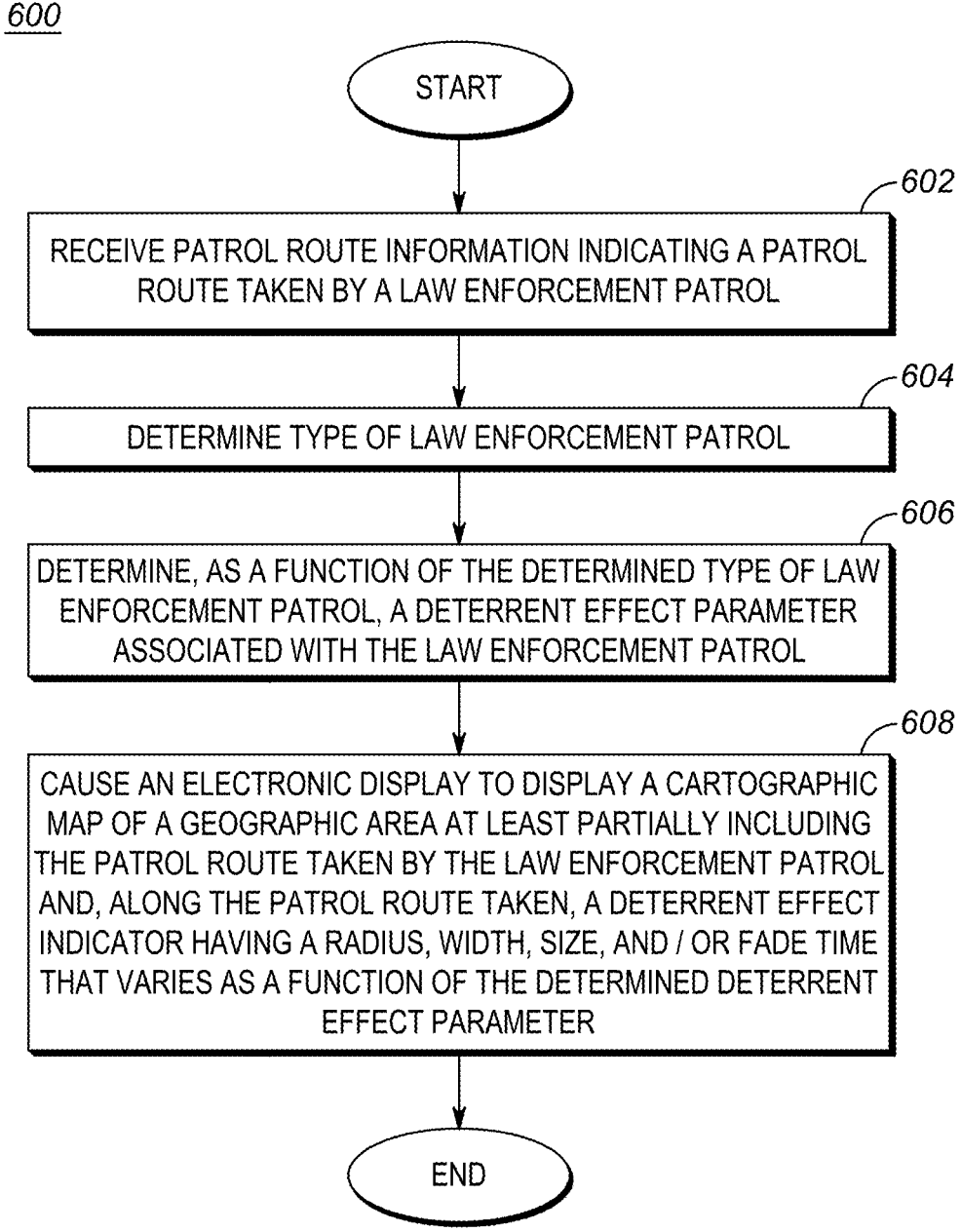
FIG. 6 is a flow chart illustrating processing steps executable at the electronic controller device of FIG. 2 for displaying and visualizing the deterrent effect indicators set forth in FIGS. 4 and 5 in accordance with an embodiment.

Static memory 216 may store operating code 225 for the microprocessor 213 that, when executed, performs one or more of the controller steps described with respect to FIGS. 6 and/or 9 and corresponding text. Static memory 216 may comprise, for example, a hard-disk drive (HDD), an optical disk drives such as a compact disk (CD) drive or digital versatile disk (DVD) drive, a solid state drive (SMD), a tape drive, a flash memory drive, or a tape drive, to name a few.

Figure 3:
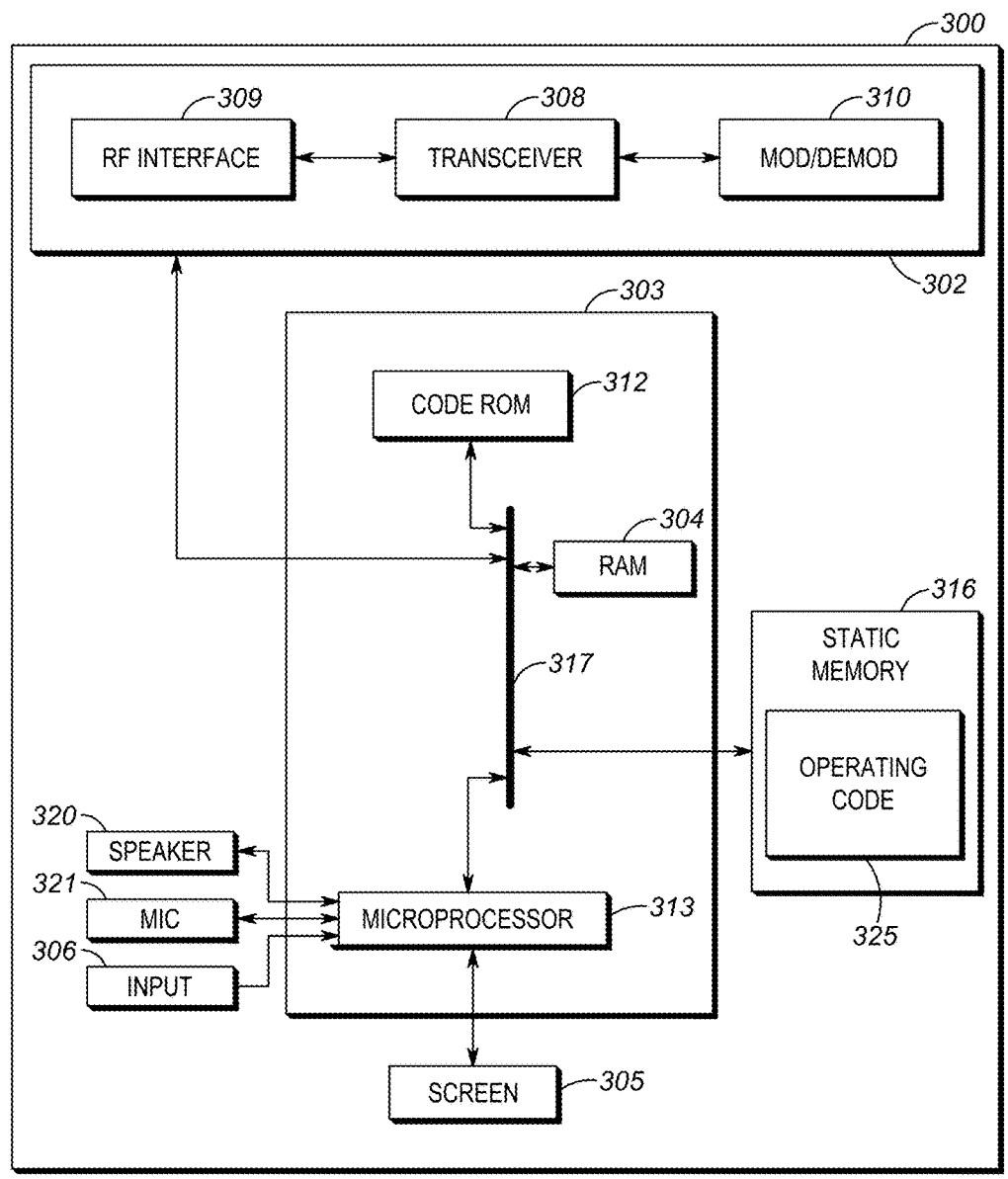
FIG. 3 is a block diagram of a law enforcement patrol subscriber unit (SU) in accordance with some embodiments.

FIG. 3 is an example functional block diagram of a subscriber unit (SU) 300. As shown in FIG. 3, SU 300 includes a communications unit 302 coupled to a common data and address bus 317 of a processing unit 303. The SU 300 may also include an input unit (e.g., keypad, pointing device, etc.) 306, an output transducer unit (e.g., speaker) 320, an input transducer unit (e.g., microphone) 321, and a display screen 305, each coupled to be in communication with the processing unit 303.

The processing unit 303 may include a code ROM 312 for initializing system components. The processing unit 303 may further include a microprocessor 313 coupled, by the common data and address bus 317, to a RAM 304 and a static memory 316. The microprocessor 313 has ports for coupling to the display screen 305, the input unit 306, the speaker 320, and the microphone 321.

The communications unit 302 may include an RF interface 309 configurable to communicate with other law enforcement patrol SUs within its communication range and/or with base stations within its communication range such as base station 130 of FIG. 1. The communications unit 302 may include one or more wireless transceivers 308, such as an APCO P25 transceiver, a DMR transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE transceiver, and/or other similar type of wireless transceiver configurable to communicate via a wireless network. The transceiver 308 is also coupled to a combined modulator/demodulator 310.

Static memory 316 may store operating code 325 for the microprocessor 313 that, when executed, performs one or more of the SU steps set forth in FIGS. 6 and/or 9 and corresponding text. Static memory 316 may comprise, for example, a HDD, an optical disk drives such as a CD drive or DVD drive, a SMD, a tape drive, a flash memory drive, or a tape drive, to name a few.

2. EXAMPLE GEOGRAPHIC AREAS AND PROCESSES FOR DISPLAYING AND VISUALIZING DETERRENT EFFECTS OF DIFFERENT TYPES OF LAW ENFORCEMENT PATROLS

Figure 4:
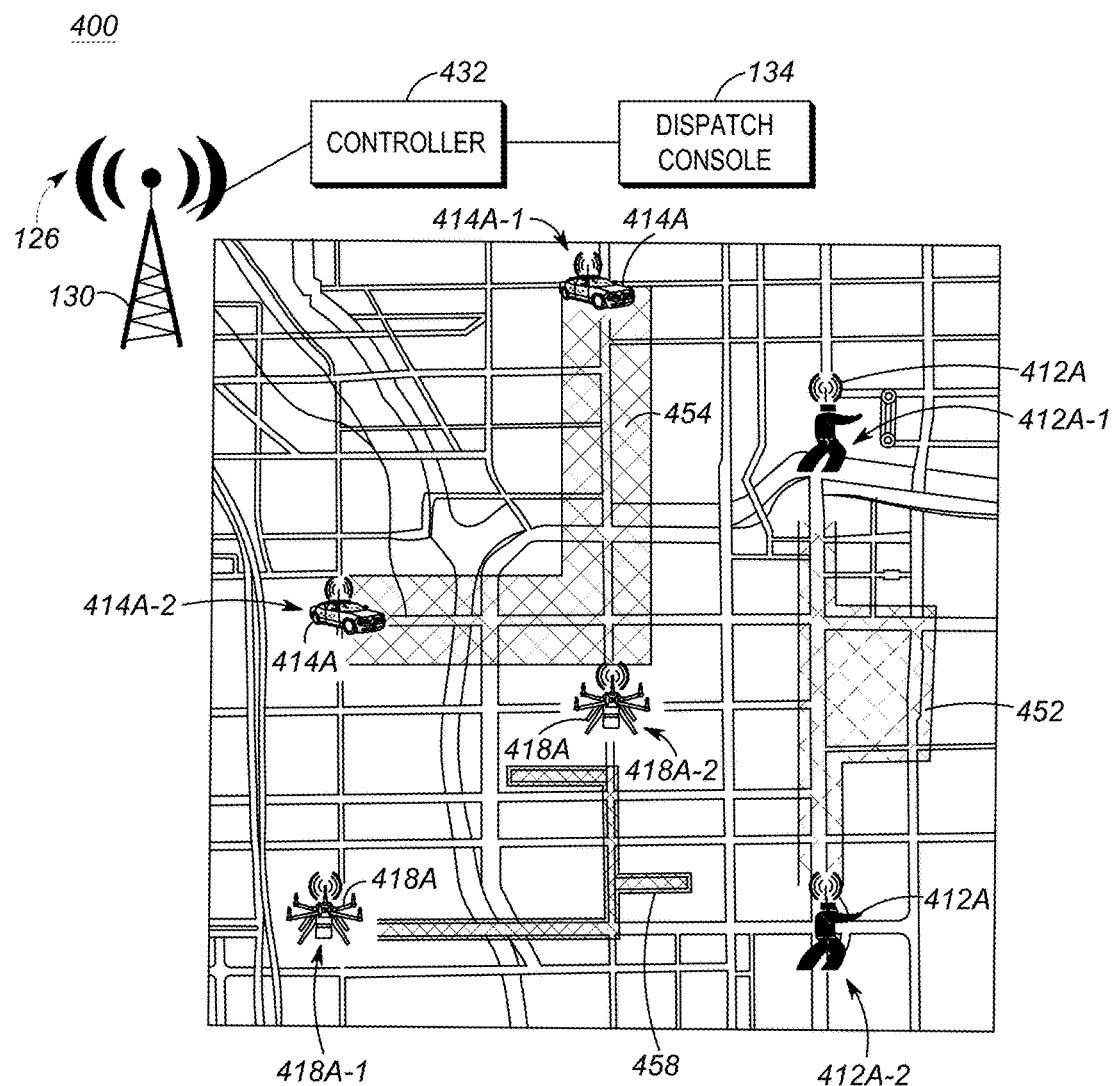
FIG. 4 is a plan view of a first example patrollable geographic area in which deterrent effect indicators associated with different types of law enforcement patrols may be visualized in accordance with an embodiment.

FIG. 4 is a plan view of a first example patrollable geographic area 400 in which deterrent effect indications of different types of law enforcement patrols may be visualized in accordance with an embodiment. For example, as on-foot law enforcement patrol 412A travels along its assigned patrol route (e.g., perhaps a same or similar route to patrol route 152 of FIG. 1), its associated SU (e.g., same or similar to SU 300 of FIG. 3) transmits its location as it moves from location 412A-1 to 412A-2 to controller 432 (e.g., same or similar to controller 200 of FIG. 2) via base station 130. As will be discussed in more detail below with respect to FIG. 6, controller 432 receives the location information from law enforcement patrol 412A, determines a type of law enforcement patrol for law enforcement patrol 412A (e.g., perhaps via a locally or remotely stored and accessed look-up table or via information transmitted by law enforcement patrol 412A along with the location information), determines a deterrent effect parameter associated with the determined type of law enforcement patrol for law enforcement patrol 412A (again, via a locally or remotely stored and accessed look-up table or via information transmitted by law enforcement patrol 412A along with the location information), and subsequently displays a deterrent effect indicator 452 as a function of the location information and determined deterrent effect parameter.

Similarly, as vehicular law enforcement patrol 414A travels along its assigned patrol route (e.g., perhaps a same or similar route to patrol route 154 of FIG. 1), its associated SU also transmits its location as it moves from location 414A-1 to 414A-2 to controller 432 via base station 130. Controller 432 receives the location information from law enforcement patrol 414A, determines a type of law enforcement patrol for law enforcement patrol 414A, determines a deterrent effect parameter associated with the determined type of law enforcement patrol for law enforcement patrol 414A, and subsequently displays a deterrent effect indicator 454 as a function of the location information and determined deterrent effect parameter.

Also similarly, as mobile aerial law enforcement patrol 418A travels along its assigned patrol route (e.g., perhaps a same or similar route as patrol route 158 of FIG. 1), its associated SU also transmits its location as it flies from location 418A-1 to 418A-2 to controller 432 via base station 130. Controller 432 receives the location information from law enforcement patrol 418A, determines a type of law enforcement patrol for law enforcement patrol 418A, determines a deterrent effect parameter associated with the determined type of law enforcement patrol for law enforcement patrol 418A, and displays a deterrent effect indicator 458 as a function of the location information and determined deterrent effect parameter.

As set forth above, type of law enforcement patrol information and deterrent effect parameter information could be stored at each law enforcement patrol 412A, 414A, 418A and transmitted to controller 432 along with location information, or could be stored locally at controller 432 or remotely from controller 432 and accessible (e.g., via external networks such as the Internet) to controller 432, or some combination thereof. In some embodiments, type of law enforcement patrol information and deterrent effect parameter information may be stored together or stored separately. One possible type of law enforcement patrol information and deterrent effect parameter information look-up table may take the form of the law enforcement patrol mapping set forth in Table I:

TABLE I

First Example Law Enforcement Patrol Mapping

| Law Enforcement Patrol SU (Identifier): | Type of Law Enforcement Patrol: | Deterrent Effect Parameter: |
|---|---|---|
| $AB5C_{16}$ | On-foot Patrolwoman or Patrolman-Marked | 0.1 mi |
| $FFFF_{16}$ | Motor Vehicle-Marked | 0.2 mi |
| $9898_{16}$ | Drone-Marked | 0.05 mi * Elevation |
| $BEBE_{16}$ | Helicopter-Marked | 1 mi |

In the first example set forth in Table I, a first column may list each law enforcement patrol's (or corresponding SU's) unique identifier and subsequent columns may set forth a type of law enforcement patrol and an associated deterrent effect parameter. For example, the law enforcement patrol 412A patrolling patrol route 152 and illustrated in FIG. 4 as having a displayed deterrent effect indicator 452 may have a unique identifier of $AB5C_{16}$, be assigned as an on-foot patrolman or patrolwoman (marked with visible law enforcement insignia) type patrol, and be assigned a corresponding deterrent effect parameter of 0.1 miles. The unique identifier in Table I may be an International Mobile Subscriber Identity (IMSI) which may be connected to a physical media (such as a Subscriber Identity Module (SIM) card) of the SU associated with the law enforcement patrol, a hardware radio medium access control address (MAC) of the SU associated with the law enforcement patrol, an internet protocol (IP) address of the SU associated with the law enforcement patrol, a vehicle identification number (VIN) of a vehicle associated with the law enforcement patrol, a serial number of a drone associated with the law enforcement patrol, a unique aircraft registration number associated with the law enforcement patrol, or some other form of value capable of uniquely identifying an individual law enforcement patrol or associated SU.

The deterrent effect parameter of 0.1 miles may define a width (in a scale of the underlying cartographic map) of a displayed solid or hatched line tracking locations of the law enforcement patrol 412A and indicative of a deterrent effect of law enforcement patrol 412A, a size of a plurality of geometric shapes having a spacing there-between that track locations of the law enforcement patrol 412A and indicative of a deterrent effect of law enforcement patrol 412A, or provide some other variable parameter as a function of a relative deterrent effect of the type of law enforcement patrol 412A.

Similarly, the law enforcement patrol 414A patrolling patrol route 154 and illustrated in FIG. 4 as having a displayed deterrent effect indicator 454 may have a unique identifier of $FFFF_{16}$, be assigned as a motor vehicle type patrol (marked with visible law enforcement insignia), and be assigned a corresponding deterrent effect parameter of 0.2 miles. The deterrent effect parameter of 0.2 miles may define a width (in a scale of the underlying cartographic map) of a displayed solid or hatched line tracking locations of the law enforcement patrol 414A and indicative of a deterrent effect of law enforcement patrol 414A, a size of a plurality of geometric shapes having a spacing there-between that track locations of the law enforcement patrol 414A and indicative of a deterrent effect of law enforcement patrol 414A, or provide some other variable parameter as a function of a relative deterrent effect of the type of law enforcement patrol 414A.

Also similarly, the law enforcement patrol 418A patrolling patrol route 158 and illustrated in FIG. 4 as having a displayed deterrent effect indicator 458 may have a unique identifier of $9898_{16}$, be assigned as a drone type patrol (marked with visible law enforcement insignia), and be assigned a corresponding deterrent effect parameter of 0.05*Elevation miles (e.g., the deterrent effect varies as a function of an elevation at which the drone is flying, which has an effect on visibility). The elevation of flight height may be reported to the controller 432 by the drone law enforcement patrol 418A itself, or may be obtained via some other flight control mechanism or database. The deterrent effect parameter of 0.05 miles*Elevation may define a width (in a scale of the underlying cartographic map) of a displayed solid or hatched line tracking locations of the law enforcement patrol 418A and indicative of a deterrent effect of law enforcement patrol 418A, a size of a plurality of geometric shapes having a spacing there-between that track locations of the law enforcement patrol 418A and indicative of a deterrent effect of law enforcement patrol 418A, or provide some other variable parameter as a function of a relative deterrent effect of the type of law enforcement patrol 418A.

Finally, and although not illustrated as present in the patrollable area 400 FIG. 4, another law enforcement patrol may have a unique identifier of $BEBE_{16}$, be assigned as a helicopter type patrol (marked with visible law enforcement insignia), and be assigned a corresponding deterrent effect parameter of 1 mile. The deterrent effect parameter of 1 mile may define a width (in a scale of the underlying cartographic map) of a displayed solid or hatched line tracking locations of the helicopter law enforcement patrol and indicative of a deterrent effect of the helicopter law enforcement patrol, a size of a plurality of geometric shapes having a spacing there-between that track locations of the helicopter law enforcement patrol and indicative of a deterrent effect of the helicopter law enforcement patrol, or provide some other variable parameter as a function of a relative deterrent effect of the helicopter type of law enforcement patrol.

While example widths and/or sizes of deterrent effect parameters for types of law enforcement patrols are shown in Table I above, other parameters and other types of law enforcement patrols could be additionally or alternatively included as well.

For example, other deterrent effect parameters could additionally or alternatively be used to visualize a deterrent effect of different types of law enforcement patrols. One possible additional or alternative type of law enforcement patrol information and deterrent effect parameter information look-up table may take the form of the law enforcement patrol mapping set forth in Table II:

TABLE II

Second Example Law Enforcement Patrol Mapping

| Law Enforcement Patrol SU (Identifier): | Type of Law Enforcement Patrol: | Deterrent Effect Parameter: |
|---|---|---|
| $AB5C_{16}$ | On-foot Patrolwoman or Patrolman-Marked | 3 hours |
| $FFFF_{16}$ | Motor Vehicle-Marked | 2 hours |
| $9898_{16}$ | Drone-Marked | 1 hour |
| $BEBE_{16}$ | Helicopter-Marked | 0.5 hours |

In the second example set forth in Table II, a first column may again list each law enforcement patrol's (or corresponding SU's) unique identifier and subsequent columns may set forth a type of law enforcement patrol and an associated deterrent effect parameter different from that set forth in Table I. The description as set forth with respect to Table I is incorporated herein by reference, with the exception that the size/distance-based deterrent effect parameter of Table I is replaced with a fade-time deterrent effect parameter in Table II. For example, the on-foot patrolwoman or patrolman law enforcement patrol having an identifier of $AB5C_{16}$ may be assigned a deterrent effect parameter of 3 hours, meaning the displayed deterrent effect indication associated with that law enforcement patrol will completely fade from display 3 hours after the law enforcement patrol has left a particular location. In some embodiments, the fade of the displayed deterrent effect indicator may be gradual over those 3 hours, while in other embodiments, the displayed fade may be substantially immediate and full at the 3 hour mark. Other law enforcement types may be assigned other fade times that relatively reflect how long a deterrent effect lasts in a particular area as a function of the law enforcement patrol type. At the end of the fade time, a subsequent re-patrol of the particular patrol route would be required to re-establish and display a corresponding deterrent effect indication for that patrol route again. While example fade times of deterrent effects for types of law enforcement patrols are shown in Table II above, other fade times and other types of law enforcement patrols could be included as well.

While Table I and Table II separately describe example singular deterrent effect parameters above, in some embodiments, multiple deterrent effect parameters may be used simultaneously such that deterrent effect indicators having multiple varying parameters based on a type of law enforcement patrol are used to visualize and display a deterrent effect map of patrol routes in a patrollable area. For example, as illustrated in the patrollable geographic area 500 of FIG. 5, and perhaps as law enforcement patrol 412A moves along an assigned patrol route 152, a corresponding fading deterrent effect indicator 552 may be determined by the controller 432 and displayed at the controller 432 (or transmitted to and displayed at the dispatch console 134 or at one of the SUs correspondingly associated with law enforcement patrols 412A, 414A, or 418A) that varies both by a width/size as set forth in Table I and by a fade time as set forth in Table II. Similar fading deterrent effect indicators 554 and 558 may be displayed for law enforcement patrols 414A and 418A, respectively.

In some embodiments, instead of directly specifying particular deterrent effect parameters for each law enforcement type, a law enforcement patrol type to deterrent effect factor mapping may be used to specify, for each law enforcement patrol type, a corresponding deterrent effect factor, and a deterrent effect factor to deterrent effect parameter mapping used to specify, for each deterrent effect factor, one or more deterrent effect parameters, thereby allowing for more efficient reuse of specified deterrent effect factors and parameters.

TABLE III

Example Patrol Type to Deterrent Effect Factor Mapping

| Type of Law Enforcement Patrol: | Deterrent Effect Factor (1-10) |
|---|---|
| On-foot Patrolwoman or Patrolman-Marked | 2 |
| Drone-Marked | 4 |
| Motor Vehicle-Marked | 6 |
| Helicopter-Marked | 10 |

TABLE IV

Example Deterrent Effect Factor to Deterrent Effect Parameter Mapping

| Deterrent Effect Factor (1-10) | Deterrent Effect Parameter 1: | Deterrent Effect Parameter 2: |
|---|---|---|
| 2 | 0.05 km | 1 hours |
| 4 | 0.1 km | 2 hours |
| 6 | 0.2 km | 3 hours |
| 10 | 1 km | 4 hours |

As set forth in Tables III and IV (setting forth different values and relationships than set forth in Tables I and II above), an intermediate deterrent effect factor mapping may be used to more generically assign same or different levels of deterrence (e.g., deterrent effect factors) to different types of law enforcement patrols, and the assigned deterrent effect factor then used to index into a deterrent effect factor to deterrent effect parameter mapping to identify one or more deterrent effect parameters for each deterrent effect factor. While some granularity and ability to vary between different types of deterrent effect parameters may be lost in using such an intermediate patrol type to deterrent effect factor mapping, ease of adding additional types of law enforcement patrols is improved as deterrent effect factors can be reused for different and newly added types of law enforcement patrols. Furthermore, the intermediate deterrent effect factor value can be used in a myriad of additional ways to perform additional functions beyond visualizing deterrence effects, as will be discussed in more detail below with respect to FIGS. 7-9.

Although Tables I-IV above focus on size/width and fade time as deterrent effect parameters for use in displaying deterrent effect indications, other alternative or additional types of parameters, such as color, density, and brightness, among others, could be variably used to visually convey a difference in deterrent effects between law enforcement patrols of different types.

FIG. 6 sets forth a flow chart illustrating a process 600 including processing steps executable at the controller 432 of FIG. 4 and/or the controller 200 of FIG. 2 for visualizing deterrent effects of law enforcement patrols in accordance with an embodiment. Of course, additional steps, receptions, and/or transmissions not disclosed herein could be additionally added before, after, or in-between process steps, receptions, and/or transmissions disclosed in FIG. 6, and the presence of such additional steps, receptions, and/or transmissions would not negate the purpose and advantages of the examples set forth in detail throughout the remainder of this disclosure.

At step 602, a controller in a RAN, in a wide area network (WAN) accessible via the RAN, or in a mobile SU operating in the RAN, receives patrol route information indicating a patrol route taken by a law enforcement patrol. The patrol route information may be provided by the law enforcement patrol itself by, for example, continuously, periodically, or intermittently transmitting its location as the law enforcement patrol moves along its assigned patrol route in a patrollable area. For example, law enforcement patrol 412A may continuously, periodically, or intermittently transmit its location as it follows the patrol route 152 of FIG. 1. One or more other law enforcement patrols of a same or different type may similarly transmit patrol route location information indicating patrol routes they have taken as well, in a same patrollable area or different patrollable area. Additionally or alternatively, fixed or mobile infrastructure having known locations may triangulate signals transmitted by the law enforcement patrol and continuously, periodically, or intermittently determine a location of the law enforcement patrol via a mathematical technique such as time difference of arrival via the infrastructure. In still further embodiments, law enforcement patrols may dictate their routes to a dispatcher at a dispatch console 134, who may then enter the path into a dispatch computer system that then provides the patrol route information to the controller executing step 602.

At step 604, the controller determines a type of the law enforcement patrol associated with the patrol route information received at step 602. As already set forth above, the determination at step 602 may be made by the controller based on type of law enforcement patrol information stored at each law enforcement patrol 412A, 414A, 418A and transmitted to the controller along with location information, or could be stored locally at the controller or remotely from the controller and accessible (e.g., via external networks such as the Internet) to the controller, or some combination thereof. In some embodiments, a type of law enforcement patrol may be determined via mapping information such as that set forth above with respect to Tables I-IV, or some variation thereof. While FIG. 6 provides an example of a single law enforcement patrol, in other embodiments, the controller may determine a type of law enforcement patrol at step 604 for a plurality of different law enforcement patrols all patrolling different patrol routes of a same patrollable area.

Potential types of law enforcement patrols may include, for example, a pedestrian law enforcement patrol (e.g., a marked or unmarked traffic control officer operating on-foot) having an associated SU, a motor vehicle law enforcement patrol (e.g., a marked or unmarked police car) having an associated SU, and a mobile aerial law enforcement patrol (e.g., marked drone or helicopter) having an associated SU. Other types of law enforcement patrols, including but not limited to a marked or unmarked law enforcement bicycle or boat, are possible as well.

At step 606, the controller determines, as a function of the determined type of law enforcement patrol, a deterrent effect parameter associated with the law enforcement patrol. The deterrent effect parameter is associated with a relative measure of an amount of deterrence effect provided by the associated type of law enforcement patrol relative to other law enforcement patrols, and is used for variably visualizing the relative deterrent effect provided by the different types of law enforcement patrols as they patrol assigned patrol routes. As set forth above with respect to Table I, the deterrent effect parameter may define a size or width associated with a geometric shape that follows a tracked location along a particular patrol route of a particular law enforcement patrol of a corresponding type, the varying size or width to be used at step 608 to visualize a deterrent effect of that particular law enforcement patrol along that particular patrol route. The size or width assigned to different types of law enforcement patrols may vary in accordance with a pre-determined relative deterrent effect associated with each type of law enforcement patrol. In other embodiments, the deterrent effect parameter may be a width, transparency, density of shading, or other variable characteristic of a continuous or discontinuous line that similarly follows the tracked location along the particular patrol route of the particular law enforcement patrol of the corresponding type, the varying line characteristic to be used at step 608 to visualize a deterrent effect of that particular law enforcement patrol along that particular patrol route.

Additionally or alternatively, and as set forth above with respect to Table II, the deterrent effect parameter may be a fade time of a continuous or discontinuous line that similarly follows the tracked location along the particular patrol route of the particular law enforcement patrol of the corresponding type, the varying fade time to be used at step 608 to visualize a deterrent effect of that particular law enforcement patrol along that particular patrol route. In some embodiments, a size, width, radius, or other distance-based deterrent effect parameter associated with a particular type of law enforcement patrol may be higher for a first type of law enforcement patrol compared to a second type of law enforcement patrol, while a fade type deterrent effect parameter associated with the second type of law enforcement patrol may be higher than the first type of law enforcement patrol, and vice versa.

In general, marked law enforcement patrols are assigned a higher deterrent effect (and thus higher or larger deterrent effect parameter) than an unmarked law enforcement patrol. For example, a distance-based deterrent effect parameter such as that set forth in Table I for marked law enforcement patrols may be reduced by 25-100% for unmarked law enforcement patrols. Similarly, time-based deterrent effect parameters such as those set forth in Table II for marked law enforcement patrols may be reduced by 25-100% for unmarked law enforcement patrols. As a further example, unmarked vehicular motor vehicle or on-foot patrol woman/man law enforcement patrols may have a deterrent effect parameter reduced by less than 100% (e.g., 50%-75%) compared to a corresponding marked vehicular motor vehicle or on-foot patrol woman/man law enforcement patrol, while unmarked drone law enforcement patrols may have a deterrent effect parameter reduced by 100% compared to marked drone law enforcement patrols.

At step 608, the controller causes an electronic display to display a cartographic map of a geographic area at least partially including the patrol route taken by the law enforcement patrol and, along the patrol route taken, a deterrent effect indicator having a radius, width, size, and/or fade time that varies as a function of the determined deterrent effect parameter of step 606. The electronic display may be directly coupled to the controller and may include, for example, a screen 205 of the controller 200 itself. In other embodiments, the controller may transmit the information sufficient to display the cartographic map and deterrent effect indicator to another remote device for display, including but not limited to, a SU at a law enforcement patrol such as law enforcement patrols 412A, 414A, 418A of FIG. 4, at a dispatch console 134, or at some other computing device accessible via a LAN or WAN communicably coupled to the controller.

In some further embodiments, the controller at step 608 may additionally access, locally or remotely, historical and/or real-time crime statistics for one or more areas in the patrollable area, and may vary a deterrent effect parameter or indicator for patrol routes taken corresponding to the one or more areas in accordance with the historical and/or real-time crime statistics. For example, a deterrent effect parameter or indicator associated with a patrol route in an area associated with high historical crime or with a high level of recent real-time reported crimes may be caused to be lowered or decreased relative to patrol routes in areas not associated with a high historical rime or with a high level of recent real-time reported crimes. As a further example, a displayed deterrent effect indicator 554 set forth in FIG. 5 of law enforcement patrol 114A may be caused to be reduced in width or decreased in fade time (e.g., a faster fade time) in those portions of the law enforcement patrol's 114A patrol route 154 in higher-relative historical crime areas compared to lower-relative historical crime areas (e.g., 0.1 mi deterrent effect parameter or indicator in lower-relative historical crime areas such as below the mean or median for a patrollable area, and a 0.05 mi deterrent effect parameter or indicator in higher-relative historical crime areas such as above the mean or median for the patrollable area, or a 2 hour fade time deterrent effect parameter or indicator in lower-relative historical crime areas such as below the mean or median for the patrollable area, and a 1 hour fade time deterrent effect parameter or indicator in higher-relative historical crime areas such as above the mean or median for the patrollable area, among other various combination and permutations). In still other embodiments, one or more of current weather condition information, current time of day information, current day of week information, and current day of year information could be used to correlate with higher or lower relative historical crime rates, and used to correspondingly vary the displayed radius, width, size, and/or fade time of the deterrent effect parameter or indicator. Other possibilities exist as well.

Figure 5:
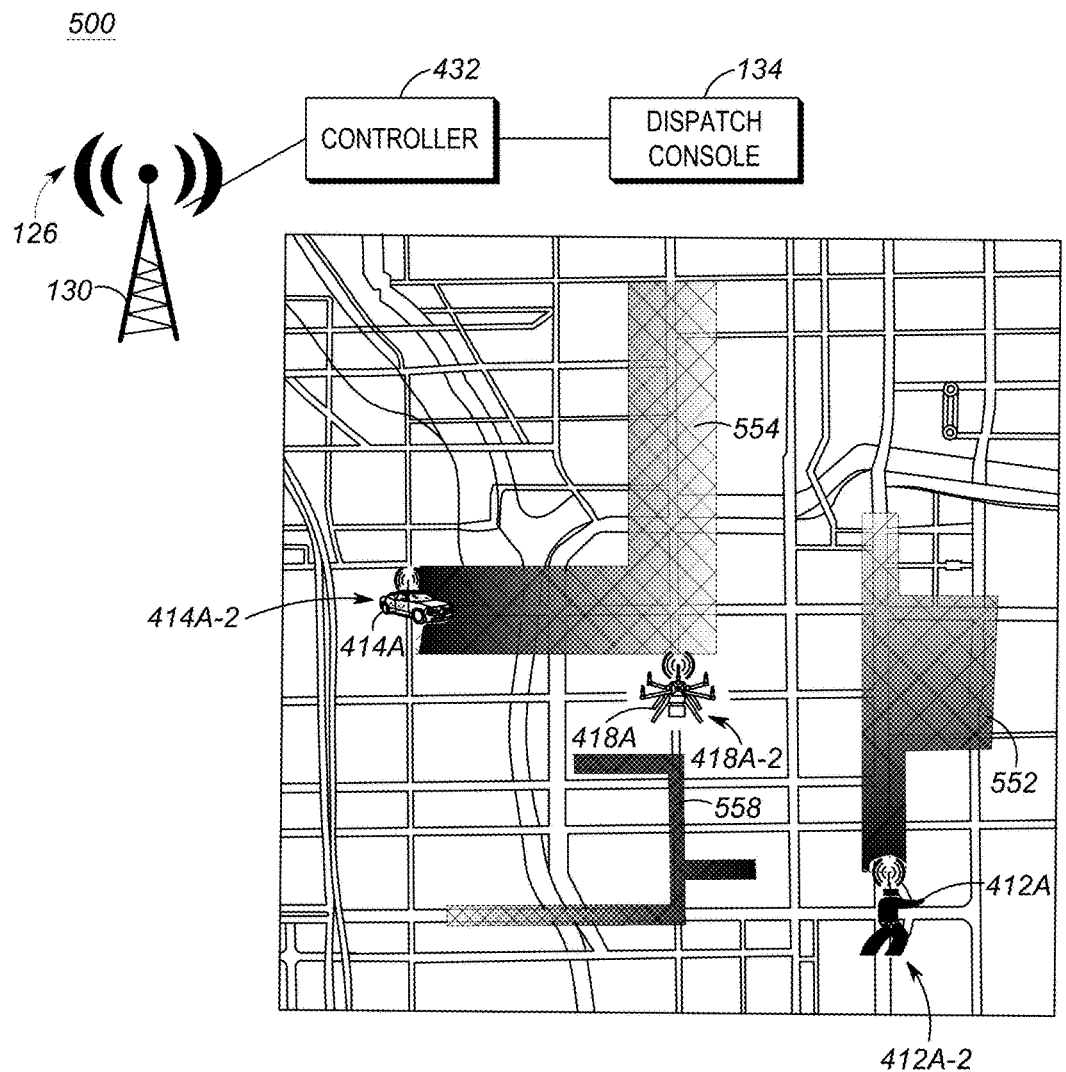
FIG. 5 is a plan view of a second example patrollable geographic area in which deterrent effect indicators associated with different types of law enforcement patrols may be visualized in accordance with an embodiment.

Finally, and as illustrated in FIGS. 4 and 5, the controller may perform steps 602-608 of FIG. 6 for a plurality of different law enforcement patrols of different law enforcement types sequentially or in parallel, causing a plurality of different deterrent effect indicators to be correspondingly displayed for a plurality of different law enforcement patrols of same or different law enforcement patrol types executing different patrol routes on a same underlying cartographic map at a same time.

3. EXAMPLE INCIDENT/RESPONSE AREAS AND PROCESSES FOR ASSIGNING DIFFERENT TYPES OF LAW ENFORCEMENT PATROLS TO PARTICULAR PATROL ROUTES USING KNOWLEDGE OF UNDERLYING HISTORICAL AND/OR REAL-TIME CRIME TRENDS

Figure 7:
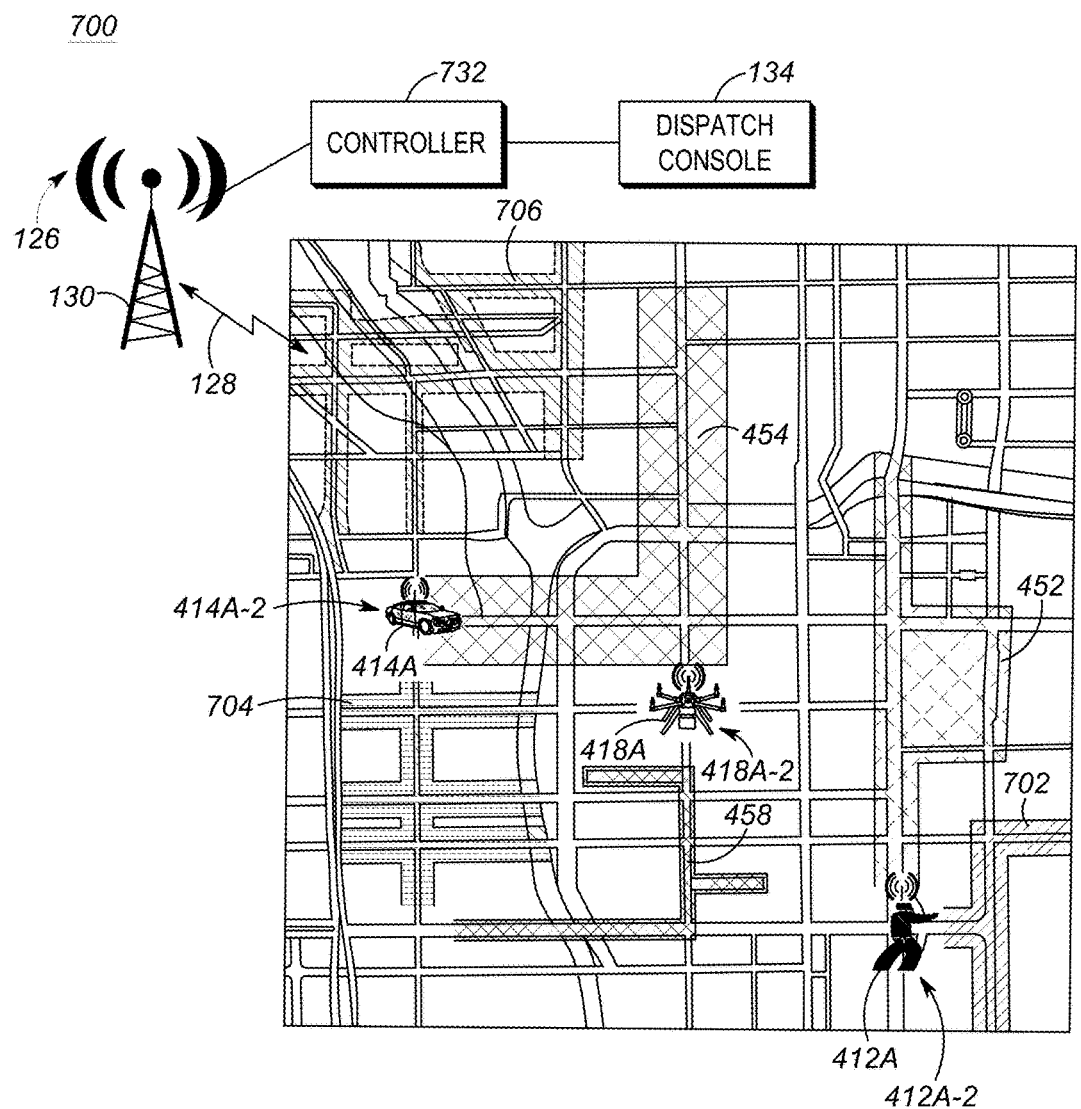
FIG. 7 is a plan view of a third example patrollable geographic area in which deterrent effect factors may be used to more intelligently assign different types of law enforcement patrols to particular patrol routes using knowledge of underlying historical and/or real-time crime trends, in accordance with an embodiment.

FIG. 7 is a plan view of an example patrollable geographic area 700 in which different types of law enforcement patrols may be assigned to particular patrol routes using knowledge of underlying historical and/or real-time crime trends in accordance with an embodiment.

In order to determine underlying historical crime trends, for example, controller 732 (e.g., same or similar to controller 200 of FIG. 2) may access historical crime statistics for each of a plurality of areas in area 700. In one embodiment, controller 732 may access historical crime statistics along a plurality of patrol routes (or portions thereof) in area 700 including a first patrol route 702, a second patrol route 704, and a third patrol route 706. The historical crime statistics may set forth an absolute number of "criminal events" and types of such criminal events along each patrol route over a determined time period (e.g., one month, one year, 10 years, etc.), and assign a numerical value to each range of either a total absolute number of criminal events over the entire determined time period (e.g., which may also be filtered by one or more of current weather condition information, current time of day information, current day of week information, and current day of year information) or an averaged number of criminal events over some sub-division of time (e.g., average monthly number of criminal events over the last year, etc.). Particular absolute or average number of criminal events could be directly used in assigning a desired threshold level of deterrence desired or could first be range-mapped to a single number between 1 and 10 (or other reduced range of values) indicative of a level of crime associated with each of the plurality of patrol routes. Types of crimes may act as multipliers of criminal events such that more serious crimes factor larger into the absolute or average criminal event count while less serious crimes factors less. For example, a patrol route having an absolute or average criminal event count of 50 criminal events may fall in a range mapped to a numerical "5" indicator, while a patrol route having an absolute or average criminal event count of 100 criminal events may fall in a range mapped to a numerical "8" indicator. In some embodiments, a threshold level of deterrence desired for the patrol route may be accordingly assigned the absolute or average criminal event count (50 or 100), while in other embodiments, the threshold level of deterrence desired for the patrol route may be accordingly assigned the range-mapped number (5 or 8). Other possibilities exist as well.

Additionally or alternatively, the historical crime statistics may set forth a relative level of crime (e.g., such as "low," "medium," or "high", perhaps identified numerically as levels '1', '4', or '7') measured relative to other patrol route or patrol route portions in the area 700. For example, after calculating crime counts for all patrol routes in the area 700, the bottom third of patrol routes in criminal event count may be assigned as having a low relative level of crime and accordingly assigned a threshold level of deterrence desired of 1, the middle third of patrol routes in criminal event count may be assigned as having a medium level of crime and accordingly assigned a threshold level of deterrence desired of 4, and the top third of patrol routes in criminal event count may be assigned as having a high level of crime and accordingly assigned a threshold level of deterrence desired of 7.

The historical crime statistics may be maintained in a database at the controller 732, or at a remote device accessible to the controller 732. The historical crime statistics database accessed by the controller 732 may already include assigned absolute crime counts, average crime counts, range-mapped crime counts, or relative levels of crime in accordance with the foregoing, or the controller 732 may separately calculate and store such information as a function of the underlying historical crime statistics retrieved from the database.

In addition to historical crime statistics, controller 732 may access real-time crime information for use in determining a threshold level of deterrence desire or for use in modifying a threshold level of deterrence desired already calculated using historical crime statistics. For example, as new incidents or criminal events are reported to controller 732 or as a threshold period of time passes since a last reported incident or criminal event associated with a particular patrol route, controller 732 may update a threshold level of deterrence desired for each of the patrol routes in the area 700. As one example, a particular patrol route may be assigned a base threshold level of deterrence desired of 1. After controller 732 receives notice of new real-time criminal activity such as a theft occurring along the particular patrol route, the controller 732 may increase the threshold level of deterrence desired for the particular patrol route by some fixed factor for each new real-time criminal act or by some variable factor associated with a severity of the newly reported criminal activity. For example, for the theft, the threshold level of deterrence may be raised to 3, while if the reported criminal activity was an attempted homicide, the threshold level of deterrence may be raised to a 7. After a threshold period of time has elapsed since the reported new real-time criminal activity occurred (e.g., 4, 8, 24, 72, or 96 hours, which again may vary based on the severity of the reported criminal activity), the controller 732 may cause the threshold level of deterrence desired for the particular patrol route to fall back to the base level of 1 (or some other intermediate level based on other criminal activity that may have occurred in the mean time).

Figure 8:
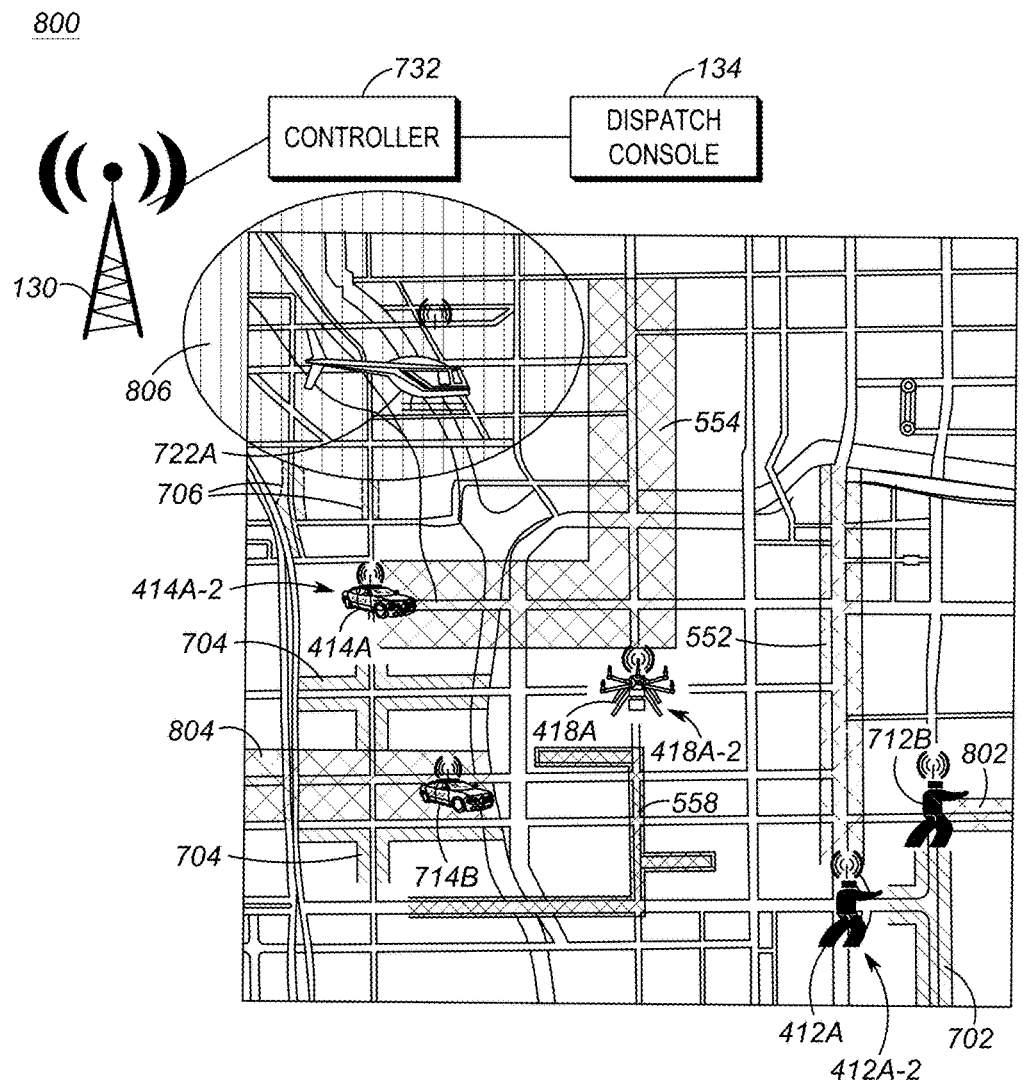
FIG. 8 is a plan view of a fourth example patrollable geographic area in which deterrent effect factors have been used to more intelligently assign different types of law enforcement patrols to particular patrol routes using knowledge of underlying historical and/or real-time crime trends, in accordance with an embodiment.

FIG. 7 illustrates an example in which the first patrol route 702 is associated with a low level of relative criminal activity and is assigned a threshold level of deterrence desired of "2", the second patrol route 704 is associated with a medium level of relative criminal activity and is assigned a threshold level of deterrence desired of "5", and the third patrol route 706 is associated with a high level of relative criminal activity and is assigned a threshold level of deterrence desired of "8", all as a function of historical and/or real-time criminal activity associated with the respective patrol route. FIG. 8 then illustrates an example in which a corresponding available law enforcement patrol of a particular type determined as a function of the threshold level of deterrence desired for each patrol route (and as a function of a threshold level of deterrence already reached via prior patrols, if any) is dispatched to each of the first, second, and third patrol routes 702, 704, 706, respectively. More specifically, each law enforcement patrol type is associated with a corresponding deterrent effect factor in a manner much the same or similar to that set forth above with respect to Table III. In this case, the controller 732 can then identify a corresponding available type of law enforcement patrol to dispatch to each of the first, second, and third patrol routes 702, 704, 706 having a sufficient deterrent effect factor equal to or greater than a difference between the threshold level of deterrence desired and the threshold level of deterrence already reached, if any, for each corresponding route.

In some embodiments, the controller 732 can use frequency, time, and/or speed as multiplier effects so that a law enforcement patrol having an insufficient deterrent effect factor of, say, 3 for meeting a threshold level of deterrence desired of 6 can use frequency (2 immediately sequential patrols), speed (one half of the normal speed limit in the area to patrol at a slower speed), or time (twice the normal time to patrol, taking a much longer time using either lower speed or periodic stops along the route, or a combination thereof) to meet the higher threshold level of deterrence desired with a law enforcement patrol type having a normally insufficient deterrent effect factor.

As set forth in FIG. 8, an available marked on-foot patrolman/patrolwoman law enforcement patrol 712B having a sufficient deterrent effect factor (of 2, from Table III) equal to or greater than the threshold level of deterrence desired of 2 (and assuming no prior patrols and thus a threshold level of deterrence reached of 0) for the first patrol route 702 is dispatched to the first patrol route 702, leaving a deterrent effect indicator 802 in its wake. In addition, an available marked motor vehicle law enforcement patrol 714B having a sufficient deterrent effect factor (of 6, from Table III) equal to or greater than the threshold level of deterrence desired of 5 (and assuming no prior patrols and thus a threshold level of deterrence reached of 0) for the second patrol route 704 is dispatched to the second patrol route 704, leaving a deterrent effect indicator 804 in its wake. Further, a marked helicopter law enforcement patrol 722A having a sufficient deterrent effect factor (of 10, from Table III) equal to or greater than the threshold level of deterrence desired of 8 (and assuming no prior patrols and thus a threshold level of deterrence reached of 0) for the third patrol route 706 is dispatched to the third patrol route 706, leaving a deterrent effect indicator 806 in its wake. Accordingly, controller 732 can use historical and/or real-time crime information to identify differences in a desired threshold level of deterrence and an achieved or reached threshold level of deterrence for a particular patrol route, and identify an available type of law enforcement patrol having an assigned minimally sufficient deterrent effect factor to compensate for the difference (or, in other embodiments, additionally or alternatively based on a maximum sufficient deterrent effect factor type of law enforcement patrol, highest availability type of law enforcement patrol, lowest cost type of law enforcement patrol, or some combination thereof), and then cause an available law enforcement patrol of the identified available type of law enforcement patrol to be dispatched to the particular patrol route.

In the example above regarding the third patrol route 706, assuming a first marked motor vehicle law enforcement patrol had recently patrolled the third patrol route 706 (thus raising the threshold level of deterrence reached from 0 to 6 in accordance with Table III), a second marked motor vehicle patrol having a now sufficient deterrent effect factor (6) could meet the difference (2) between the threshold level of deterrent desired (8) and the threshold level of deterrence reached (6), and could be identified to be dispatched by the controller 732 instead of the helicopter. In a further embodiment in which a fade time of 3 hours is assigned to the second marked motor vehicle patrol, 2 hours into the fade time the threshold level of deterrence reached may fade below 2 (e.g., ⅓ of the original 6), at which time the marked motor vehicle would no longer have a deterrent effect factor sufficient to meet the difference, absent application or some form of multiplier and corresponding action. Other examples are possible as well.

Figure 9:
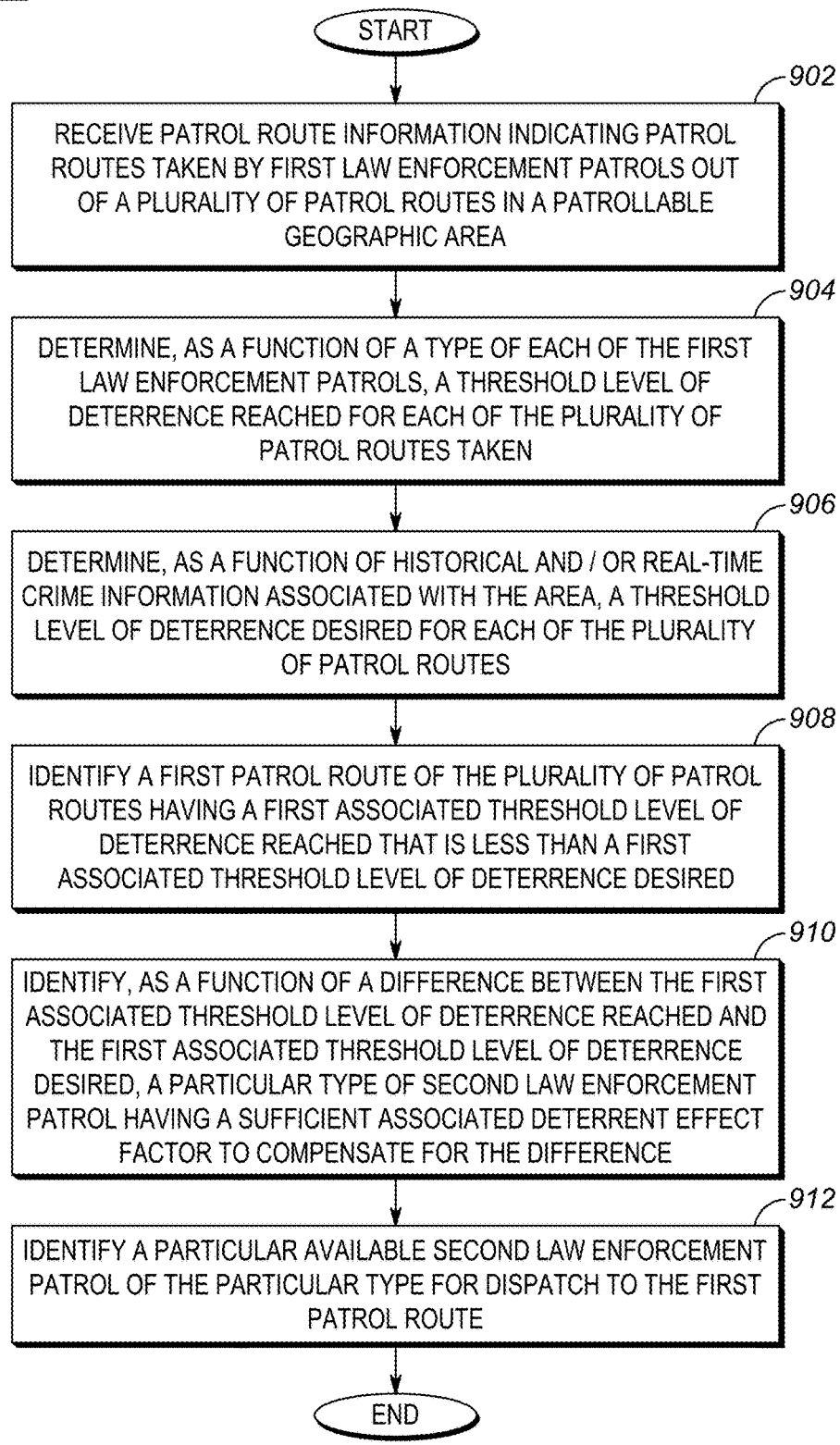
FIG. 9 is a flow chart illustrating processing steps executable at the electronic controller device of FIG. 2 in which deterrent effect factors are used to more intelligently assign different types of law enforcement patrols to particular patrol routes using knowledge of underlying historical and/or real-time crime trends, in accordance with an embodiment.

FIG. 9 includes a flow chart illustrating a process 900 including processing steps executable at the controller 132 of FIG. 1 and/or the controller 200 of FIG. 2 for assigning different types of law enforcement patrols to particular patrol routes using knowledge of underlying historical and/or real-time crime trends, in accordance with an embodiment. Of course, additional steps, receptions, and/or transmissions not disclosed herein could be additionally added before, after, or in-between process steps, receptions, and/or transmissions disclosed in FIG. 8, and the presence of such additional steps, receptions, and/or transmissions would not negate the purpose and advantages of the examples set forth in detail throughout the remainder of this disclosure.

At step 902, a controller in a RAN, in a WAN accessible via the RAN, or in a mobile SU operating in the RAN, receives patrol route information indicating patrol routes taken by first law enforcement patrols out of a plurality of patrol routes in a patrollable area. The patrol route information received by the controller at step 902 from each of the plurality of first law enforcement patrols may be received in a same or similar manner as that set forth in step 602 above.

At step 904, the controller determines, as a function of a type of each of the first law enforcement patrols, a threshold level of deterrence reached for each of the plurality of patrol routes taken. As part of this process, the controller may determine a type of law enforcement patrol for each of the first law enforcement patrols in a same or similar manner as that set forth in step 604 above. Once the controller determines the type of law enforcement patrol for each of the first law enforcement patrols, the controller can determine a threshold level of deterrence reached. For example, the controller may access a patrol type to deterrent effect factor mapping same or similar to that set forth in Table II above and use the corresponding deterrent effect factor as the threshold level of law enforcement deterrence reached for the corresponding patrol routes taken, perhaps modified by any applicable multiplier as discussed previously.

In another example, the controller may additionally access a law enforcement patrol mapping such as that set forth in Table II and use the corresponding time to fade deterrent effect parameter value to modify and decrease the deterrent effect factor and thus the threshold level of deterrence reached evenly over time or entirely at the end of the fade time. Other possibilities exist as well.

At step 906, the controller determines, as a function of historical and/or real-time crime information associated with the patrollable area and/or each patrol route, a threshold level of deterrence desired for each of the plurality of patrol routes in a same or similar manner to that already set forth above with respect to the description of FIG. 7.

At step 908, the controller identifies a first patrol route of the plurality of patrol routes in the patrollable area having a first associated threshold level of deterrence reached that is less than a first associated threshold level of deterrence desired, in a same or similar manner to that already set forth above with respect to the description of FIG. 7. In some embodiments, the controller may identify a plurality of first patrol routes having such differences. As set forth earlier, the deficiency identified at step 908 may be a result of a lack of any patrols taken along the first patrol route, or may be a result of a law enforcement patrol that has patrolled along the first patrol route of a law enforcement patrol type that has an insufficient deterrent effect factor (on its own or additionally increased by speed, frequency, or time and/or decreased by a fade time) to cause a threshold deterrent effect reached to be less than the threshold deterrent effect desired along the first patrol route.

At step 910, the controller identifies, as a function of a difference between the first associated threshold level of deterrence reached and the first associated threshold level of deterrence desired for the first patrol route, a particular type of second law enforcement patrol having a sufficient associated deterrent effect factor to compensate for the difference in a same or similar manner to that already set forth above. For example, if the difference is 5, the controller may access a mapping such as that set forth in Table III above and identify a marked helicopter and a marked motor vehicle as having a sufficient deterrent effect factor to compensate for the difference. In some embodiments, the controller may use a multiplier such as frequency, time, and/or speed to also identify a type of law enforcement patrol having an insufficient deterrent effect factor to meet the difference, but which may be caused to meet the difference when multiplied by the multiplier. For example, the marked patrolman or patrolwoman type of law enforcement patrol having a deterrent factor of 2 may be caused to meet the difference of 5 by requiring three sequential patrols of the identified patrol route, or requiring that the patrol be performed at one third the normal speed or at three times the normal total time period. Other possibilities exist as well.

In choosing which type of law enforcement patrol type to dispatch at step 910, a number of additional factors may be considered by the controller. For example, the controller may identify a particular type of second law enforcement patrol having a highest availability out of all types of law enforcement patrols having a deterrent effect factor that is sufficient to compensate for the difference. As one example, if the number of marked motor vehicles available is 5 while the number of marked helicopters is 1, both of which have a sufficient deterrent effect factor to meet the difference, the controller may select the type of law enforcement patrol having the highest availability (in this case, the marked motor vehicle type).

The controller may additionally or alternatively consider a cost associated with dispatching each type of second law enforcement patrol, and select the available type of second law enforcement patrol having a lowest total cost to dispatch out of all types of second law enforcement patrols having a deterrent effect factor sufficient to compensate for the difference. For example, and given the same scenario set forth in the prior paragraph, if a cost to dispatch the marked helicopter (e.g., $100) is greater than a cost to dispatch a marked motor vehicle (e.g., $15), and both are available to dispatch, the controller may identify the lower cost to dispatch type of law enforcement patrol.

In embodiments where the controller considers both cost and availability, the controller may calculate an overall dispatch preference value as a function of both availability and cost, such as $A*X+B*1/Y=Z$, where X is cost, Y is availability (# of units of that type), and A and B are predetermined scalar weights (such as A=1 and B=0.5 to prefer cost over availability in the decision) and identify the type of law enforcement patrol to dispatch as the type associated with the lowest value Z.

Still further, in some embodiments the control may identify an available type of law enforcement patrol having an assigned minimally sufficient deterrent effect factor to compensate for the difference, while in other embodiments, the control may identify an available type of law enforcement patrol having a maximum effect factor that is still sufficient to compensate for the difference. Other possibilities exist as well.

At step 912, the controller identifies a particular available second law enforcement patrol of the particular type of second law enforcement patrol identified at step 910 to dispatch to the first patrol route. In one embodiment, the controller may actually transmit a dispatch notice to a SU associated with the particular available second law enforcement patrol including information sufficient to identify the first patrol route. In another embodiment, the controller may transmit a dispatch notice to a dispatcher at a dispatch console such as dispatch console 134 in FIG. 7 identifying the particular available second law enforcement patrol and the first patrol route, and relying upon the dispatcher to formally dispatch the particular available second law enforcement patrol. Other mechanisms for dispatching the particular available second law enforcement patrol are possible as well.

4. CONCLUSION

In accordance with the foregoing, an improved method and apparatus for visualizing deterrent effects of law enforcement patrols, and for more intelligently assigning different types of law enforcement patrols to particular patrol routes using knowledge of underlying historical and/or real-time crime trends, is advantageously disclosed, allowing for improved patrolling efforts and corresponding deterrent effects that can result in reduced crime rates across patrolled geographic areas. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method of displaying crime deterrent effects for varying types of law enforcement patrols, the method comprising:
receiving, at a computing device, patrol route information indicating a patrol route taken by a law enforcement patrol;
determining, by the computing device, a type of the law enforcement patrol;
determining, by the computing device, as a function of the determined type of the law enforcement patrol, a deterrent effect parameter value associated with the law enforcement patrol amongst one or more other different deterrent effect parameter values associated with types of law enforcement patrol other than the determined type of the law enforcement patrol, the deterrent effect parameter value setting forth a relative measure of an amount of crime deterrence effect provided by the law enforcement patrol relative to other types of law enforcement patrols; and causing, by the computing device, an electronic display to display a cartographic map of a geographic area at least partially including the patrol route taken by the law enforcement patrol and, along the patrol route taken, to display a deterrent effect indicator having at least one of a radius, width, size, and fade time that varies as a function of the determined deterrent effect parameter value.

2. The method of claim 1, wherein the type of the law enforcement patrol is selected from a marked vehicle, an unmarked vehicle, a marked patrolman or patrolwoman, an unmarked patrolman or patrolwoman, a marked drone, and a marked helicopter.

3. The method of claim 1, further comprising retrieving, by the computing device, a deterrent effect parameter mapping that, for each of a plurality of different types of law enforcement patrols, sets forth the at least one of the radius, width, and fade time deterrent effect parameter value to be associated with the corresponding type of law enforcement patrol.

4. The method of claim 3, wherein the deterrent effect parameter mapping reflects a deterrent effect parameter value associated with a patrolman or patrolwoman type of law enforcement patrol having a higher relative crime deterrent effect than a deterrent effect parameter value associated with a vehicle type of law enforcement patrol.

5. The method of claim 3, wherein the deterrent effect parameter mapping reflects a deterrent effect parameter value associated with a marked drone type of law enforcement patrol having a lower relative crime deterrent effect than a deterrent effect parameter value associated with a patrolman or patrolwoman type of law enforcement patrol and lower than a deterrent effect parameter value associated with a the vehicle type of law enforcement patrol.

6. The method of claim 3, wherein the deterrent effect parameter mapping reflects a deterrent effect parameter values associated with marked types of law enforcement patrols having a higher relative crime deterrent effect than deterrent effect parameter values associated with unmarked types of law enforcement patrols.

7. The method of claim 1, further comprising:
receiving, at the computing device, an indication that the law enforcement patrol has changed from the determined type of the law enforcement patrol to a second type of the law enforcement patrol different from the determined type of the law enforcement patrol, and subsequently receiving second patrol route information indicating a second patrol route taken by the law enforcement patrol after having changed from the determined type of the law enforcement patrol to the second type of the law enforcement patrol; and
causing, by the computing device, the electronic display to display, along the second patrol route taken by the law enforcement patrol, a second deterrent effect indicator having at least one of a second radius, width, and fade time different from the at least one of the radius, width, and fade time of the deterrent effect indicator.

8. The method of claim 1, wherein the deterrent effect indicator is a line that follows the patrol route taken by the law enforcement patrol and has a width that varies as a function of the determined deterrent effect parameter value.

9. The method of claim 1, wherein the deterrent effect indicator comprises a plurality of geometric shapes having a spacing there-between that follows the patrol route taken by the law enforcement patrol and each geometric shape having a size that varies as a function of the determined deterrent effect parameter value.

10. The method of claim 1, wherein the deterrent effect indicator is a line or a plurality of geometric shapes having a spacing there-between that follows the patrol route taken by the law enforcement patrol and having a fade time that varies as a function of the determined deterrent effect parameter value.

11. The method of claim 10, wherein the deterrent effect indicator fades steadily over the fade time and, at an end of the fade time, is no longer visible on the electronic display.

12. The method of claim 1, further comprising retrieving, by the computing device, a level of historical crime associated with an area along the patrol route taken by the law enforcement patrol, and the computing device further varying the displayed at least one of the radius, width, size, and/or fade time of the deterrent effect indicator as a function of the level of historical crime.

13. The method of claim 1, further comprising retrieving, by the computing device, a plurality of levels of historical crime associated with a plurality of areas along the patrol route taken by the law enforcement patrol, and further varying portions of the displayed at least one of the radius, width, size, and fade time of the deterrent effect indicator as a function of the level of historical crimes in each of the plurality of areas along the patrol route.

14. The method of claim 1, further comprising retrieving, by the computing device, one or more of current weather condition information, current time of day information, current day of week information, and current day of year information, and further varying the displayed at least one of the radius, width, size, and fade time of the deterrent effect indicator as a function of the one or more of current weather condition information, current time of day information, current day of week information, and current day of year information.

15. The method of claim 1, further comprising:
receiving, at the computing device, second patrol route information indicating a second patrol route taken by a second law enforcement patrol;
determining, by the computing device, a type of the second law enforcement patrol different from the type of the law enforcement patrol;
determining, by the computing device, as a function of the determined type of the second law enforcement patrol, a second deterrent effect parameter value associated with the second law enforcement patrol, the second deterrent effect parameter value different from the deterrent effect parameter value; and
causing, by the computing device, the electronic display to display, along the second patrol route taken, a second deterrent effect indicator having at least one of a second radius, width, size, and fade time that varies as a function of the type of the determined second deterrent effect parameter value, the second deterrent effect indicator different from the deterrent effect indicator.

16. The method of claim 1, wherein the cartographic map is obtained via a geographic information system (GIS).

17. A controller for causing an electronic display of crime deterrent effects for varying types of law enforcement patrols, the controller comprising:
a transceiver;
a data store; and
one or more processors configured to:
receive, via the transceiver, patrol route information indicating a patrol route taken by a law enforcement patrol;
determine a type of the law enforcement patrol;

determine, as a function of the determined type of the law enforcement patrol, a deterrent effect parameter value associated with the law enforcement patrol amongst one or more other different deterrent effect parameter values associated with types of law enforcement patrol other than the determined type of the law enforcement patrol, the deterrent effect parameter value setting forth a relative measure of an amount of crime deterrence effect provided by the determined type of law enforcement patrol relative to other types of law enforcement patrols; and cause an electronic display to display a cartographic map of a geographic area at least partially including the patrol route taken by the law enforcement patrol and, along the patrol route taken, to display a deterrent effect indicator having at least one of a radius, width, size, and fade time that varies as a function of the determined deterrent effect parameter value.

18. The controller of claim 17, wherein the type of the law enforcement patrol is selected from a marked vehicle, an unmarked vehicle, a marked patrolman or patrolwoman, an unmarked patrolman or patrolwoman, a marked drone, and a marked helicopter.

19. The controller of claim 17, the one or more processors further configured to:

retrieve, via the data store, a deterrent effect parameter mapping that, for each of a plurality of different types of law enforcement patrols, sets forth the at least one of the radius, width, and fade time deterrent effect parameter value to be associated with the corresponding type of law enforcement patrol.

20. The controller of claim 19, wherein the deterrent effect parameter mapping reflects a deterrent effect parameter value associated with marked types of law enforcement patrols having a higher relative crime deterrent effect than deterrent effect parameters associated with unmarked types of law enforcement patrols.

* * * * *